Oct. 26, 1948.                    J. E. DUBE                    2,452,441
            REGULATOR VALVE HAVING A CAPILLARY
                   TUBE EXPANSION PASSAGE
                     Filed June 17, 1944
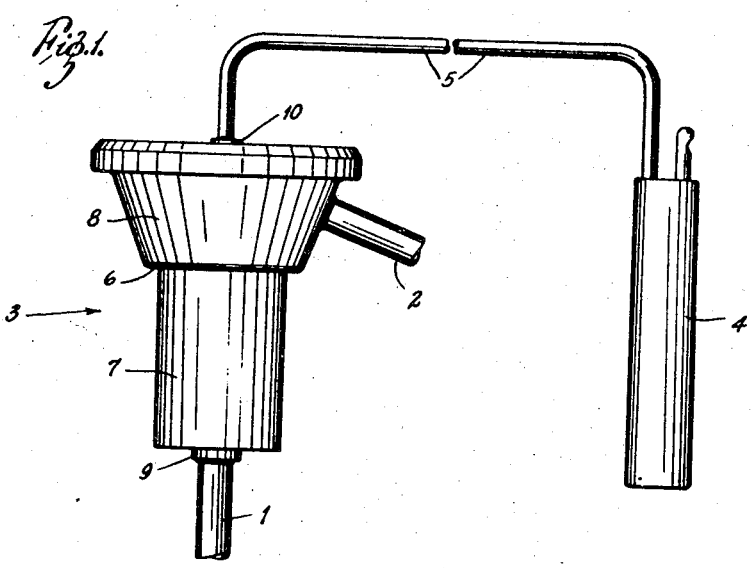
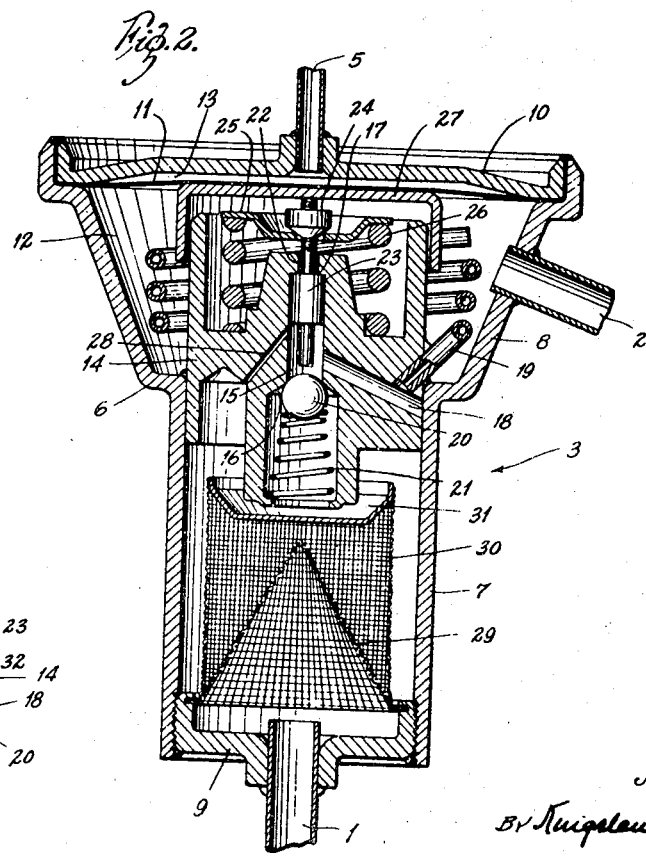
INVENTOR:
JOHN E. DUBE,
ATTORNEYS Patented Oct. 26, 1948

2,452,441

UNITED STATES PATENT OFFICE 2,452,441

REGULATOR VALVE HAVING A CAPILLARY TUBE EXPANSION PASSAGE

John E. Dube, Clayton, Mo., assignor to Alco Valve Company, University City, Mo., a corporation of Missouri Application June 17, 1944, Serial No. 540,817

10 Claims. (Cl. 62—127)

This invention relates to a pressure responsive regulator device, and more particularly to that type of such device which is controlled by temperature change to regulate the flow of an expanding fluid in a system such as that employed for refrigeration.

An object of the invention is to produce an improved regulator device for a refrigeration system in which is combined a capillary tube and a superheat control.

Another object is to produce a regulator device for a small refrigeration system which will permit the elimination of a receiver in the system and the use of a smaller motor to drive the compressor.

A further object is to combine in a refrigeration regulator device a capillary tube and a temperature controlled valve a means for equalizing pressures on opposite sides of the valve when the valve is closed, and which will be so controlled that erratic opening and closing of the valve will not take place.

A further object is to provide a regulator device for refrigeration systems that will permit the use of a single size capillary tube for numerous refrigeration system loads.

In the drawings:

Fig. 1 is an external view of a regulator device as associated with a refrigeration line and a thermal mechanism;

Fig. 2 is a vertical sectional view of the device showing details of construction; and Fig. 3 is a view showing a modified construction.

Referring to the drawings in detail, and first to Figs. 1 and 2, the improved regulator device is shown as being embodied in a refrigeration system in which the pipes 1 and 2 form part of a conduit through which an expanding refrigerant fluid is conducted, as, for example, to an evaporator. In this conduit between these pipes is the improved regulator device 3, the pipe 1 conducting fluid to the regulator and the pipe 2 conducting fluid from the regulator to the inlet of the evaporator. The regulator device is adapted to be controlled by the pressure of the fluid passing to the evaporator and also by pressure from a thermal mechanism subject to temperature changes, which in a refrigerator system are the temperature changes present adjacent the evaporator outlet. As shown in Fig. 1, the thermal mechanism comprises a suitable bulb 4 positioned in the evaporator outlet, which bulb is preferably liquid charged. Between this bulb and the regulator device 3 is a tube 5 whereby changes in pressure due to changes in temperature may be transmitted to act as a control for the regulator device.

As best shown in Fig. 2, the specific regulator device disclosed by way of example has a casing 6 comprising a cylindrical portion 7 and a flared portion 8. The pipe 1 communicates with the chamber formed by the cylindrical portion through an end closure member 9. The flared portion of the casing is closed by a cover member 10 which also serves as a means for clamping a diaphragm 11 positioned across the flared portion, this diaphragm forming with the flared portion of the casing a chamber 12, and with the cover 10 a second chamber 13. The chamber 13 is in communication with the previously mentioned conduit 5 coming from the bulb, said conduit being connected to a part in the cover member 10. The chamber 12 below the diaphragm is connected to communicate with the outlet pipe 2.

Within the casing 6 is a body member 14 which is secured to the casing at the juncture of the cylindrical and flared portions, thus providing a partition between the cylindrical chamber and the chamber 12 in the flared portion. Axially extending through this body member is a bore 15 with which is associated at its lower end a valve seat 16 and at its upper end a second stop 17 in the form of a shoulder. Extending laterally from the portion of the bore just above the valve seat is a passage 18 which communicates with a capillary tube 19 arranged in the form of a coil and positioned to surround the portion of the body member projecting into the chamber 12. The outlet end of the coil is free to discharge into the chamber 12 and thus fluid flowing from the pipe 1 to the pipe 2 must pass through this capillary tube.

A valve element 20 in the form of a ball cooperates with the valve seat 16, said ball being urged toward a seated position by a light spring 21. The upper end of the bore 15 receives a stem 22 which is provided with an enlarged cylindrical portion 23, the upper end of which is arranged to cooperate with the shoulder 17 to limit the upward movement of the stem. The lower end of this stem projects below the cylindrical portion and is arranged to engage and unseat the ball valve element 20 when the stem is moved downwardly from the position shown. The upper end of the stem above the enlarged cylindrical portion is threaded and carries an adjusting nut 24 with which abuts a plate 25 acted on by a coil spring 26 interposed between the plate and the body member 14. Resting on the upper end of the stem is a cup-shaped cap 27 with which cooperates the diaphragm to actuate the stem against the bias of the spring 26 and so move the stem downwardly that the ball valve element will be unseated.

The body member 14 is also provided with a small passage 28 which places the cylindrical chamber in communication with the bore above the ball valve element, thus providing a bypass around the ball valve so that there can be a slight pressure equalizing flow of fluid between the pipes 1 and 2 when the ball valve element is seated. The end of this passage 28 enters the bore at a point just below the enlarged cylindrical portion 23 on the stem when the stem is in its extreme upper position. This permits the enlarged cylindrical portion 23, which has a close fit in the bore, to act as a valve element for controlling the bypass passage. When the stem moves downwardly to unseat the ball of the valve element, the bypass passage 28 will be closed by the cylindrical portion 23. By providing a bypass around the valve 20 which will be open when the valve is closed there will be sufficient communication between the pipes 1 and 2 to insure that the pressures in the pipes and the chambers with which they are connected will be equalized.

In Fig. 3, the cylindrical enlargement 23 of the valve stem is provided with a tapered portion 32 to control the flow through the bypass passage. This permits a larger passage to be drilled. The degree of taper will then determine the bypass flow.

The closure member 9 carries a conical shaped coarse screen 29 and a surrounding cylindrical fine screen 30 having a plate 31 at its upper end acting as a baffle. These two screens serve as a filter for the fluid which is transferred from the pipe 1 to the pipe 2 through the regulator, and insure that all particles of foreign matter will be removed.

*Operation*

At the start of any cycle, it will be assumed that the valve 20 is closed, and the piston 23 elevated to open the bypass 28. This latter insures that in due time after any closing of the valve 20 (the time being a function of the size of the bypass), the fluid pressures on opposite sides of the valve will be equal, which is to say that the high fluid pressure ahead of the valve will dissipate into the low pressure lines beyond the valve.

When the valve is closed, this fact represents pressure conditions on the diaphragm 11 wherein the combination of P26 (spring pressure) plus P12 (gas pressure below the diaphragm) is greater than P13 (gas pressure above the diaphragm which is a function of bulb temperature). In other words, the bulb temperature is relatively low. This condition normally occurs at the time the compressor is shut off by its external means typified by a refrigerator thermostat.

When the compressor restarts, it must pull a load on the low side of the valve, and apply a load to the high side. Since the actual fluid pressures at this time are equal on both sides, the compressor motor operates against virtually no load at the instant of starting, and may come up to a speed developing high power before it is required to deliver high load. Hence a motor with low starting torque may be used.

At the normal instant of start, the bulb 4 is at a temperature that would represent excessive superheat and consequently high P13 were the system in full operation. However, expansion of the diaphragm is prevented by the relatively high, equalized pressure, below the diaphragm, P12. When the compressor, after starting, pulls P12 down, the diaphragm will expand, and will early close the bypass 28, thus accelerating the reduction of P12. Thereupon, as P13 becomes greater than P12 plus P26, by increasing amounts, the valve will be opened, and the refrigeration cycle set under way.

The position of the valve 20 during the cycle is always determined by the difference between P13 and P12 plus P26. As the refrigeration load increases, bulb temperature increases, and P13 increases. This tends to open the valve further to obtain increased flow of refrigerant. Without more, such would represent increased superheat in the evaporator, aggravated by the higher P12 caused by larger valve opening. However, with P12 introduced in opposition to P13, the diaphragm will adjust to accommodate the higher P12, and will maintain a constant superheat, the value of which is finally determined by the spring pressure P26, as set by the nut 24.

Conversely, as the load decreases, P13 decreases, and P12 decreases in opposition; whereupon, with the effectively constant spring pressure, the valve will move toward closed position, adjusting to a new load but at constant superheat. Normally, at the time the compressor is stopped, the refrigeration capacity relative to load demand will be high, and the valve will be virtually closed. When the compressor actually stops, the pressure drop across the valve stops, and P12 is lowered below the closing point. Thereafter the pressures equalize through the bypass 28 and the valve is ready to recycle upon restart.

The initial closing of the valve is not accompanied by opening of the bypass. Consequently the valve may throttle to a fine position under control of the diaphragm.

In some installations it may be desirable to employ the bypass 28 as a fixed load pressure reduction element. In this construction, the size of the bypass will be determined for producing a pressure drop while the compressor is running, that develops a normal refrigeration capacity, that may be augmented by the valve operation upon load demands exceeding that normal.

With this improved regulator device, the capillary tube will carry some fixed proportion of the pressure drop of the system. By combining with it the superheat control valve, flow through the tube will be permitted under the control of changes in superheat. Only a simple type of valve is necessary as the pressure drop through the valve port is minimized by the tube.

By providing a bypass for the valve, the combining of the superheat controlled valve and the capillary tube is made practical, to attain the virtues of a capillary, without its disadvantages which include its inflexibility as a control medium. Additionally, the valve increases the efficiency of the capillary in the latter's normal functions. For example, should the capillary become clogged, as with a body of oil, the main valve will thereby be caused to open, and effect a high pressure against the block to expel it.

The system needs no receiver as the bypass, by equalizing pressures, eliminates high pressures against which the motor may start, permitting a smaller motor to be employed for driving the compressor as already noted. Further, the use of the bypass for the valve insures that no erratic operation will occur by gas entering the liquid line, as, if such happens, and the valve closes, the bypass will carry the gas to the low side, and the valve will reopen automatically and without overloading the motor. An important feature of the valve and bypass arrangement is the closing of the bypass when the valve is to be controlled. By eliminating bypassing under these conditions, erratic functioning of the valve is eliminated, as all fluid flow must then be controlled by the valve.

A regulator device constructed in accordance with the invention will permit a single regulator device to be designed for use in all small systems having loads below a certain fractional horsepower. The particular construction of the regulator device permits the capillary tube to be embodied within the device in a compact manner. Also the construction and arrangement permit sufficient room for the use of a large filter embodying both a coarse and a fine screen which is found to be very helpful in insuring proper filtering of the fluid over a long period of time in order to insure that the bypass passage and capillary tube will function properly.

What is claimed is:

1. In a thermostatic expansion valve for use in a fluid pressure reducing system, a valve housing having a valve port therein between high and low pressure sides, an expansion valve controlling the port, means to move the valve relative to the port to control fluid flow and fluid pressure drop therethrough including a movable pressure responsive wall having opposite pressure chambers, means introducing into one chamber a first pressure that is a function of pressure on the low side of the valve, said pressure being adapted to displace the wall in a direction to effect throttling of the valve, and means introducing a second pressure into the other chamber that is a function of the temperature of the fluid on the low pressure side, said second pressure being adapted to displace the wall in a direction to open the valve, and a restricted bypass port between the high and low pressure sides of the valve to effect equalization of pressures on opposite sides of the valve when the same is closed.

2. In a regulating device for a fluid conducting conduit, a valve for the conduit, a capillary tube connected to the outlet side of the valve and through which the fluid flowing through the conduit must pass, a restricted passage for bypassing fluid around the valve when the same is closed, a pressure controlled member for controlling the opening and closing of the valve, said member being subject on one side to the pressure of the fluid in the conduit beyond the capillary tube, and means for subjecting the opposite side of the member to pressure from a pressure producing means controlled by temperature changes.

3. In a regulator device for the flow of an expanding fluid through a conduit, a valve associated with the conduit, a capillary tube connected to the outlet side of the valve and through which the fluid must pass after passing the valve, a pressure operated member connected to the valve, means for subjecting the member to the pressure of the fluid on the outlet side of the valve and tending to close the valve, means producing a pressure to act on the pressure operated member and tending to open the valve, and bypass means for the valve controlled to be open only when the valve is closed.

4. In a regulator device, a casing provided with two chambers and a communicating passage including a capillary tube, a valve for the passage, means for bypassing fluid around the valve, said capillary tube being connected to the outlet side of the valve and beyond the bypass, so that all fluid flowing through the bypass and valve must pass through the tube, means for controlling the opening and closing of the valve by a movable member subject to variable pressures on opposite sides thereof, and means for closing the bypass when the valve is opened.

5. In a regulating device, a casing provided with chambers one of which has a fluid inlet and the other a fluid outlet, means providing a passage between the chambers including a capillary tube connected to discharge into the chamber having the outlet, a valve for the passage, a restricted passage for bypassing fluid around the valve, a member operatively connected to control the opening and closing of the valve, a spring for biasing the member in a direction to permit closing of the valve, said member also being arranged to be so subject to the pressure of the fluid in the chamber having the outlet as to move it in a direction to permit closing of the valve, and means for subjecting said member to pressure from a pressure producing means controlled by temperature changes.

6. In a regulating device, a casing having portions of different cross-sectional areas, a member providing a partition between said portions with a part projecting into the larger portion, said partition member having a passage therethrough and a valve seat associated with the passage, a capillary tube having one end connected to the passage and its other end opening into the larger portion of the casing, said tube being arranged in a coil in surrounding relation to the projecting portion of the partition, a spring biased valve element cooperating with the valve seat, means providing a restricted bypass passage for the valve, a member carried by the partition member for opening the valve, a diaphragm dividing the larger portion of the casing into two chambers and arranged to cooperate with the stem to control the opening and closing of the valve element, said diaphragm being subject to pressure of fluid in the enlarged portion having the outlet and acting to move the diaphragm to permit closing of the valve element, and means for subjecting the opposite side of the diaphragm to a pressure from a pressure producing means which will act to move the diaphragm to open the valve element.

7. In a temperature controlled device for regulating flow of an expanding fluid through a refrigeration system, a casing provided with two chambers and a connecting passage having an associated valve seat, a poppet valve element cooperating with said seat, a restricted bypass around the valve, a stem for moving said valve element off the seat, a spring normally biasing the stem to a position permitting seating of the valve element, a movable member associated with the stem and arranged to be subject to fluid pressure in the chamber on the outlet side of the valve in order to oppose the movement of the member and stem to open the valve element, temperature responsive means for producing a pressure acting on the movable member in opposition to the fluid pressure and tending to move the stem to open the valve, and means so associated with the stem and the bypass as to close the bypass when the stem is moved to open the valve.

8. In a pressure reducing device for a fluid conducting conduit, a casing provided with a passage through which the fluid flows, said passage having a capillary tube forming a part thereof, and the passage having a valve seat, a valve element for the seat arranged to be opened by movement in a direction against the flow of fluid through the passage, a spring for biasing the element to a seated position, a separate stem for moving the valve element off its seat, a bypass around the valve element and having an outlet adjacent the stem, means carried by the valve stem for closing the outlet of the bypass when the stem is moved to unseat the valve element, and means for controlling the movement of the stem to unseat the valve element and permit seating thereof.

9. An expansion valve construction comprising a housing having an inlet and an outlet, partition means between them, a passage through the partition, an expansion valve controlling said passage, thermostatic means to operate the expansion valve to obtain regulated fluid flow from the inlet to the outlet and to reduce the pressure in the fluid, and a bypass connection around the expansion valve, said passage through the partition including a capillary tube to reduce the pressure in the fluid flowing through the passage.

10. A thermostatic valve including a housing, an inlet and an outlet therein, a partition between them, a main passage through the partition having a valve seat, a valve, means urging the valve toward the seat, a stem, an opening through the partition in which the stem is slidably mounted, a bypass from one side of the partition to said opening, temperature-responsive means to move the stem toward the valve to open it upon predetermined temperature changes, means on the stem to cover said opening, said means being disposed to uncover the opening when the stem is withdrawn from position to open the valve, and to cover the opening when the stem opens the valve.

JOHN E. DUBE.

REFERENCES CITED

The following references are of record in the file of this patent:

UNITED STATES PATENTS

| Number | Name | Date |
|---|---|---|
| 212,408 | Shell | Feb. 18, 1879 |
| 616,197 | Moller | Dec. 20, 1898 |
| 995,402 | Davis | June 13, 1911 |
| 1,066,213 | Moore | July 1, 1913 |
| 1,223,299 | Taylor | Apr. 17, 1917 |
| 1,289,512 | Minard | Dec. 31, 1918 |
| 1,666,283 | Farley | Apr. 17, 1928 |
| 1,803,074 | Schickler | Apr. 28, 1931 |
| 1,890,494 | Borden | Dec. 13, 1932 |
| 1,935,181 | Farley | Nov. 14, 1933 |
| 2,068,858 | Jones | Jan. 26, 1937 |
| 2,271,833 | Shipman | Feb. 3, 1942 |
| 2,309,405 | Matteson | Jan. 26, 1943 |
| 2,326,093 | Carter | Aug. 3, 1943 |
| 2,337,862 | Baer | Dec. 28, 1943 |